United States Patent [19]

Denis et al.

[11] Patent Number: 5,239,601
[45] Date of Patent: Aug. 24, 1993

[54] CONNECTION PROCESS BETWEEN AN OPTICAL FIBRE AND AN OPTICAL MICROGUIDE

[75] Inventors: Hervé Denis, Saint-Egreve; Pierre Gidon, Echirolles; Serge Valette, Grenoble, all of France

[73] Assignee: Commissariat a l'Energie Atomique, Paris, France

[21] Appl. No.: 768,183

[22] PCT Filed: Mar. 1, 1991

[86] PCT No.: PCT/FR91/00167
§ 371 Date: Oct. 16, 1991
§ 102(e) Date: Oct. 16, 1991

[87] PCT Pub. No.: WO91/13378
PCT Pub. Date: Sep. 5, 1991

[30] Foreign Application Priority Data

Mar. 1, 1990 [FR] France ............... 90 02575

[51] Int. Cl.$^5$ ............... G02B 6/00; G02B 6/36
[52] U.S. Cl. ............... 385/49; 385/85; 156/643
[58] Field of Search ............... 385/49, 85–89; 156/643, 644, 645, 646

[56] References Cited

U.S. PATENT DOCUMENTS

| | | | |
|---|---|---|---|
| 4,764,245 | 8/1988 | Grewal | 156/643 |
| 4,973,133 | 11/1990 | Matz et al. | 385/49 |
| 5,077,818 | 12/1991 | Stein | 385/49 |
| 5,080,458 | 1/1992 | Hockaday | 385/49 X |
| 5,119,451 | 6/1992 | Wills et al. | 385/49 X |

FOREIGN PATENT DOCUMENTS

| | | |
|---|---|---|
| 0331332 | 9/1989 | European Pat. Off. . |
| 0331333 | 9/1989 | European Pat. Off. . |
| 0331338 | 9/1989 | European Pat. Off. . |
| 3615519 | 11/1987 | Fed. Rep. of Germany . |

OTHER PUBLICATIONS

Patent Abstracts of Japan, vol. 9, No. 56 (E-302)(1779), Mar. 12, 1985 & JP, A, 59197184 (Nippon Denki) Nov. 8, 1984.
Patent Abstracts of Japan, vol. 6, No. 243 (E-145)(1121), Dec. 2, 1982, & JP, A, 57143890 (Fujitsu) Sep. 6, 1982.
Patent Abstracts of Japan, vol. 9, No. 90 (P-350)(1813), Apr. 19, 1985, & JP, A, 59218406 (Nippon Denshin) Dec. 8, 1984.

*Primary Examiner*—Akm E. Ullah
*Attorney, Agent, or Firm*—Oblon, Spivak, McClelland, Maier & Neustadt

[57] ABSTRACT

A connection process between an optical fiber and an optical microguide, the microguide having on a substrate, a structure having two media and a core between the media and whose refractive index is higher than those of the media, wherein substantially anisotropic etching takes place of the structure from one end of the microguide, so as to eliminate from the structure a zone allowing the axis of the core as the median line and whose width is at least equal to the external diameter of the fiber. Etching by a dry process takes place of part of the substrate which is located beneath the thus eliminated zone and over a depth making it possible to bring into coincidence the core of the microguide and the core of the fiber, when the latter rests on the bottom of the recess formed in this manner in the substrate and the fiber is fixed in said recess.

19 Claims, 8 Drawing Sheets

CONNECTION PROCESS BETWEEN AN OPTICAL FIBRE AND AN OPTICAL MICROGUIDE

BACKGROUND OF THE INVENTION

1. Field of the Invention

The present invention relates to a process for connection between an optical fiber and an optical microguide. The optical fiber can be a monomode or monomodal fiber or a multimode or multimodal fiber

2. Discussion of the Background

The optical microguide is of the type which comprises, on a substrate, a guidance structure incorporating a core called the "microguide core" and located between two media, whose respective refractive indices are below the refractive index of the microguide core.

By definition, a guidance structure is a structure resulting from the superimposing of three media, the intermediate medium (the core) having a refractive index higher than that of the two other media.

A microguide is a special guidance structure, whereof at least one of the three media constituting the guidance structure is laterally limited (e.g. by etching), so as to ensure a lateral confinement of the light.

The axis of the microguide core (corresponding to the microguide axis) is then defined as an axis located mid-height of the medium forming the core, parallel to the axis of the laterally limited or defined medium or media and contained in the same plane as said axis, said plane being perpendicular to the planes of the layers of the guidance structure.

Strictly speaking the core axis should be defined from the overlap integral of the guided modes of the fiber and the microguide, which must be at a maximum. In practice, said axis is always very close to the geometrical axis of the previously defined core. Therefore it is the latter axis which will be considered throughout the remainder of the description for simplicity reasons.

Moreover, for greater clarity, the following description refers to a microguide, whereof only the medium forming the core is laterally limited, it being obvious that the invention applies to all types of microguides.

On returning to the two media between which is located the microguide core, the upper medium, i.e. that not in contact with the substrate, can be air, but in general the adjacent media to the core are constituted by two layers of appropriate materials or the same appropriate material, which can be silica when the substrate is of silicon.

The present invention more particularly applies to the field of integrated optics. In this field, the coupling operation between a monomode or multimode optical fiber and an optical microguide is important and must be at the same time:

(1) effective, i.e. must lead to connection losses not exceeding approximately 0.5 to 1 dB,
(2) fast and therefore, if possible, must not require micropositioning of the fiber before the latter is rendered integral with the optical microguide and
(3) inexpensive, while integrating in the best possible way with the other technical operations leading to the production of the optical microguide.

The present invention relates to a process able to satisfy the aforementioned requirements.

Figure 1:
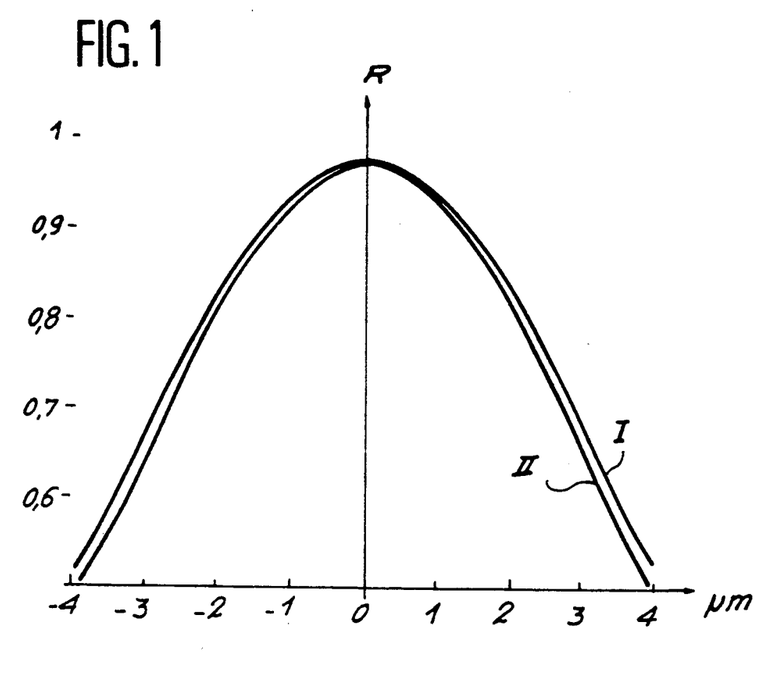
FIG. 1 shows the variations of the coupling efficiency between an optical fiber and an optical mircroguide as a function of the misalignment of the latter and which has already been described.
Figure 2:
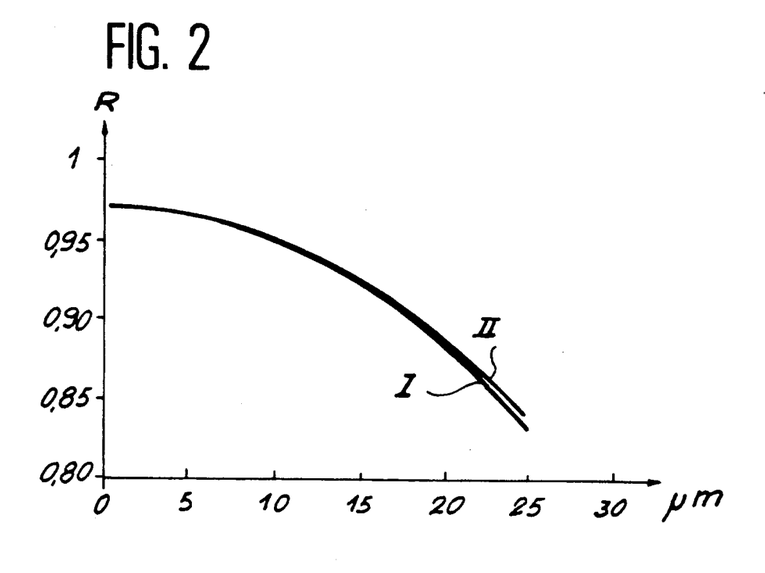
FIG. 2 indicates the variations of the coupling efficiency between an optical fiber and an optical microguide as a function of the distance between the latter and has already been described.

FIGS. 1 and 2 illustrate the importance of obtaining a correct connection between an optical fiber and an optical microguide. In an exemplified manner use is made of a fiber of type STL CW 1505 E, whose core has a diameter of 8 micrometres and which is used with a light, whose wavelength is 1.55 micrometers.

FIG. 1 shows the variations of the coupling efficiency R as a function of the misalignment of the optical axis of the fiber and the optical axis of the microguide (said misalignment being expressed in micrometers), for a microguide having, between two silica layers, a doped silica core, whose cross-section is shaped like a square with a 4.8 micrometer side length and whose optical index exceeds that of the adjacent layers by a value equal to $6 \cdot 10^{-3}$ (i.e., curve I in FIG. 1) or $7 \cdot 10^{-3}$ (i.e., curve II in FIG. 1).

FIG. 2 shows the variations of the coupling efficiency R as a function of the distance (in micrometers) between the aforementioned optical fiber and an optical microguide having, between two silica layers, a doped silica core, whose optical index exceeds by $7 \cdot 10^{-3}$ that of the adjacent layers and whose cross-section is shaped like a square with a 5 micrometre side length (i.e., curve I of FIG. 2) or the shape of a rectangle 6 micrometers long and 5 micrometers wide (i.e., curve II of FIG. 2).

Connection processes between an optical fiber and an optical microguide are already known.

Figure 3:
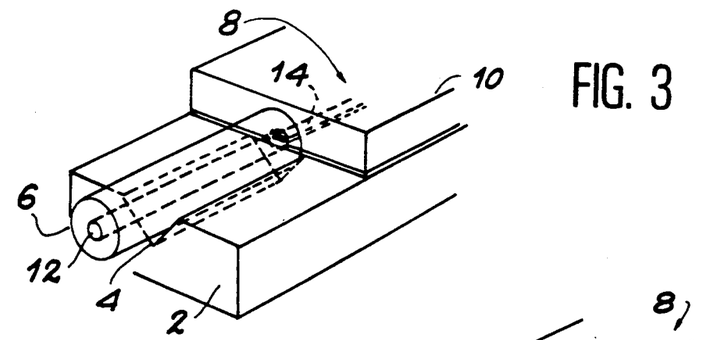
FIG. 3 diagrammatically shows a known connection process between an optical fiber and an optical microguide and which has already been described.

One of these known processes is diagrammatically illustrated in FIG. 3 and firstly consists of forming in a support 2, a V-shaped recess 4 for receiving the optical fiber 6. When the latter is put in place in its recess 4, the microguide 8 is positioned on the support 2 facing the fiber.

This microguide comprises, e.g. on a substrate 10, two silica layers between which is located the microguide core and the positioning is carried out in such a way that the substrate 10 is not in contact with the support 2, so that it is one of the two silica layers which is in contact with said support.

The depth of the V-shaped recess 4 is such that the axis of the core 12 of the fiber 6, which is put into place in said recess 4, projects beyond the surface of the support 2 and substantially coincides with the axis of the optical microguide core 14.

The relative lateral positioning of the optical fiber 6 with respect to the optical microguide 8 generally takes place with the aid of not shown rails formed both on the support 2 and at least in the silica layer in contact with the support 2.

This known process suffers from the disadvantage of requiring two supports, namely the support 2 and the substrate 10 of the optical microguide 8. Moreover, bearing in mind the alignment constraints, it is very difficult to obtain an effective coupling between the optical fiber and the optical microguide without dynamic alignment of the two supports (i.e. without micropositioning of the microguide 8 and therefore its substrate 10 with respect to the support 2), which leads to a long connection time and to high connection costs.

Figure 4:
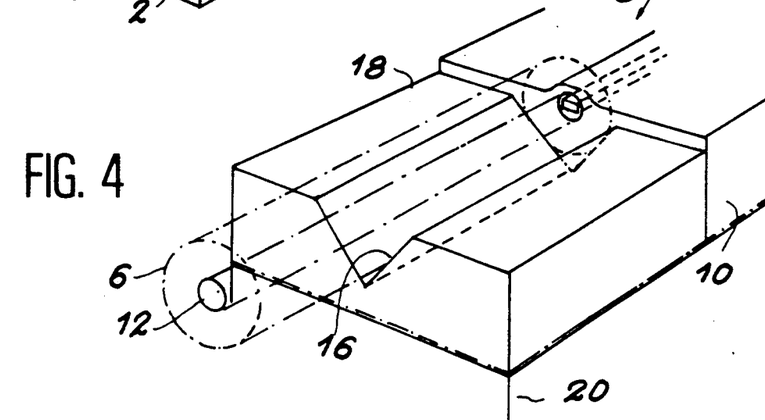
FIG. 4 diagrammatically illustrates another known connection process between an optical fiber and an optical microguide and which has already been described.

According to a second known process diagrammatically illustrated by FIG. 4, the optical fiber 6 is put into place in a V-shaped recess 16 formed in the support 18, like support 2, said support 18 being put into place on another support 20 and, in turn, the microguide 8 is placed on the support 20, so that its substrate 10 is in contact with the support 20. The depth of the recess 16 is such that the optical fiber core axis can then be substantially aligned with the axis of the core of the microguide 8.

Therefore this second known process is even more complicated and costly than the first known process, because it requires an additional support.

SUMMARY OF THE INVENTION

The present invention relates to a connection process between an optical fiber and an optical microguide, which is simpler and therefore less expensive than the aforementioned known processes. This simplification more particularly results from the fact that, in the present invention, use is only made of a single support, namely the substrate on which is formed the optical microguide.

More specifically, the present invention relates to a connection process between an optical fiber and an optical microguide comprising, on a substrate, a guidance structure having a core and two media, whose respective refractive indices are below those of the core of the structure, called the microguide core, said core being located between the two media, said process being characterized in that it comprises the following stages:

the guidance structure is etched from one end of the optical microguide, so as to eliminate from said structure a zone allowing the axis of the microguide core as the median line and whose width is at least equal to the external diameter of the optical fiber, part of the substrate located beneath the thus eliminated zone is etched by the dry process over a depth making it possible to substantially bring about coincidence between the axis of the core of the microguide and the axis of the core of one end of the fiber said end resting on the bottom of the recess formed in this way in the substrate and the end of the optical fiber is fixed in the recess so as to substantially obtain said coincidence.

Obviously, the zone eliminated from the guidance structure has an adequate length, e.g. approximately 100 to 1000 micrometers, to enable said fiber to be appropriately maintained in the recess formed in the substrate by etching the latter.

The use of dry etching in the present invention for etching said portion of the substrate, makes it possible to produce the recess in any random direction. Preferably, the guidance structure is etched substantially anisotropically.

According to a preferred embodiment of the inventive process, the dry etching of said portion of the substrate is isotropic. This leads to a recess with concave lateral or side walls. Seen in cross-section, said recess essentially has the shape of a U with concave lateral branches. Bearing in mind the concavity of the etched walls of the substrate, there is an advantageous definition of lateral supporting points, for the lateral positioning of the fiber, on the walls of the etched guidance structure, which permits a good centering of the fiber relative to the core. Moreover, a supporting point for the vertical positioning of the fiber is defined in the bottom of the recess formed in the substrate.

According to a preferred embodiment of the process according to the invention, the width of said zone is equal to the external diameter of the fiber.

In this case, it is not necessary to carry out a dynamic positioning of the optical fiber relative to the optical microguide, which leads to a process which is simpler than the first known process referred to hereinbefore and which requires dynamic positioning.

Obviously, as a variant, e.g. in the case of imprecisions on the fiber diameter, the width of the eliminated zone can exceed the given external diameter of the optical fiber and can e.g. 1.05 to 1.2 times said diameter, but then there will be a dynamic positioning of the optical fiber relative to the optical microguide.

Moreover, when the substrate is etched, the guidance structure can be slightly etched when the etching of the substrate is not sufficiently selective with respect to the materials of the guidance structure, there then being an overetching of said guidance structure.

Account should be taken of said overetching on etching the guidance structure, by providing a width of the zone substantially equal to the difference between that which it is wished to be finally obtained and the estimated value of the overetching.

Moreover, when said overetching is not the same for all the layers of the guidance structure, particularly with respect to the interface of the microguide, e.g. in the case of a structure of type $SiO_2/Si_3N_4/SiO_2$, it is also appropriate to completely or partly protect said interface in order not to disturb the fiber microguide connection.

In order to carry this out, it is possible to produce the microguide in such a way that its superstrate, of $SiO_2$ in the aforementioned example, completely covers the microguide core and the guidance structure is etched so as to leave a limited superstrate thickness before the core.

The process according to the invention is compatible with other technical processes which may be used, inter alia for producing the optical microguide and other optical components.

According to a special embodiment of the process according to the invention, the microguide substrate is of silicon and is etched by reactive ionic etching, using as the mask the previously etched guidance structure and whose constituent materials are chosen for them to be able to fulfill this mask function. Thus, use is made of dry and advantageously isotropic etching leading to a substantially U-shaped recess having concave lateral branches, instead of a V-shaped recess.

It should be noted that, in the present invention, bearing in mind the fact that the substrate is dry etched, there is no orientation problem such as would occur in the case of a connection between an optical fiber and an optical microguide, if the fiber were placed in a V-shaped recess formed in a silicon substrate by preferred chemical etching of the silicon and if the microguide were itself previously formed on said substrate.

Thus, in such a substrate, the direction of the V-shaped recess would be imposed by the direction of the type 111 crystallographic planes. Consequently there could only be two possible relative orientations of the V-shaped recess relative to the microguide, said two orientations being perpendicular to one another.

The special embodiment referred to hereinbefore does not suffer from such a disadvantage, because it utilizes a reactive ionic etching of the substrate, which can e.g. be carried out with the aid of a microwave plasma.

In a special embodiment of the invention, the substrate is of silicon, the media adjacent to the core being not intentionally doped silica layers and the core is of doped silica.

In another special embodiment, the substrate is of silicon, the media adjacent to the core are not intentionally doped silica layers and the core is of silicon nitride or silicon oxynitride.

In the present invention, the recess formed in the substrate of the optical microguide is only used for the depth positioning, or vertical positioning of the optical fiber. Therefore the depth of said recess is chosen so as to substantially permit the coincidence of the respective axes of the optical fiber core and the optical microguide core in projection on a plane perpendicular to the surface of the optical microguide.

The lateral positioning of the optical fiber is ensured by the guidance structure, or more precisely by its side walls, which appear when elimination takes place of said zone of the guidance structure, the distance between said walls (width of the eliminated zone) being equal to the external diameter of the optical fiber.

When the media surrounding the optical microguide core are silica layers, the total thickness of the said silica layers (i.e., the height of the side walls of the guidance structure) can be approximately 15 to 30 micrometer. Such a height is sufficient to ensure the lateral positioning of the optical fiber when the width of the eliminated zone is equal to the external diameter of said fiber.

In order to improve the relative positioning of the optical fiber and the optical microguide, it is possible to etch the guidance structure and the substrate in such a way that, from the side of the fiber microguide interface, the width of the eliminated zone decreases towards said interface.

In order to eliminate a misalignment problem between the optical fiber and the optical microguide, which might appear when the optical fiber is too close to the optical microguide core, it is possible to etch the guidance structure so as to free from it a tongue, which allows as the median line the axis of the microguide core and whose width is at the most equal to the depth of the recess. Advantageously, the tongue length is at least equal to the recess depth.

An index adapting material is preferably located at the fiber microguide interface in order to improve the coupling efficiency between the fiber and the microguide.

The invention also relates to a connection process between an optical fiber and an optical microguide comprising, on a substrate, a guidance structure having a core and two media, whose respective refractive indices are below that of the core of the structure, called the microguide core, said core being located between the two media, characterized in that it comprises the following stages:

one of the media is formed on the substrate, on said medium formed on the substrate is formed an intermediate layer from which the microguide core is subsequently produced, the intermediate layer is etched so as to form the core of the microguide and eliminate from said intermediate layer a zone allowing the axis of the microguide core as the median line and whose width W is chosen so as to permit the subsequent positioning of the optical fiber in alignment with the microguide core, on the structure resulting from the said etching of the intermediate layer is formed an overlap layer constituting the other medium, the resulting guidance structure is etched so as to eliminate from said guidance structure another zone substantially allowing the axis of the microguide core as the median line and whose width, decreased by the width of the eliminated zone of the intermediate layer, is at least equal to twice the uncertainty on the superimposing of said zones, dry etching takes place of part of the substrate located beneath the zone eliminated in this way from the guidance structure, over a depth making it possible to bring about substantial coincidence between the axis of the microguide core and the axis of the core of one end of the fiber when said end rests on the bottom of the recess formed in this way in the substrate and the end of the optical fiber is fixed in this recess so as to substantially bring about the coincidence.

The latter process has the advantage of defining the lateral supporting points of the fiber in the guidance structure with the same mask level as that making it possible to produce the microguide core (lateral supporting points spaced by W). In this way, the median plane to the axis connecting the lateral supporting points contains both the axis of the fibre and that of the microguide core.

Preferably, the guidance structure is substantially anisotropically etched. Preferably, the etching by the dry process of said part of the substrate is isotropic.

Various ideas will not be considered using silicon as an example.

A chemical anisotropic etching (or wet anisotropic etching) of the silicon stops on the 111 planes. It can only be used for forming V's (from 100 planes) or U's (from 110 planes) in two directions which are parallel or perpendicular and which are the traces of planes of type 111.

A dry anisotropic etching, as opposed to wet etching, of Si can be used in the invention.

A chemical isotropic etching (or wet isotropic etching) of Si is independent of the crystalline directions and can be used with the same advantages as dry isotropic etching, but is more difficult to carry out.

A dry isotropic etching (as opposed to wet etching) of Si is preferably used in the invention and is independent of the crystalline directions. It requires lateral supporting points for the lateral positioning of a fiber. According to the invention for this purpose use is made of silica walls surmounting the etched Si substrate. The etching depth is controllable in situ during the etching of Si for the vertical positioning of the fibre.

BRIEF DESCRIPTION OF THE DRAWINGS

The present invention is described in greater detail hereinafter relative to non-limitative embodiments and with reference to the attached drawings, wherein.

DESCRIPTION OF THE PREFERRED EMBODIMENTS

A special embodiment of the inventive process will now be described. It consists of connecting an optical fibre to an optical microguide 22 formed from a guidance structure placed on a substrate 26. The guidance structure comprises (cf. FIG. 5) a layer 28 located on the substrate 26 and another layer 30 located on the layer 28 and, between the layers 28 and 30, the rectilinear core 32 of the microguide, whose refractive index exceeds the refractive index of the layer 28 and the refractive index of the layer 30.

Figure 5:
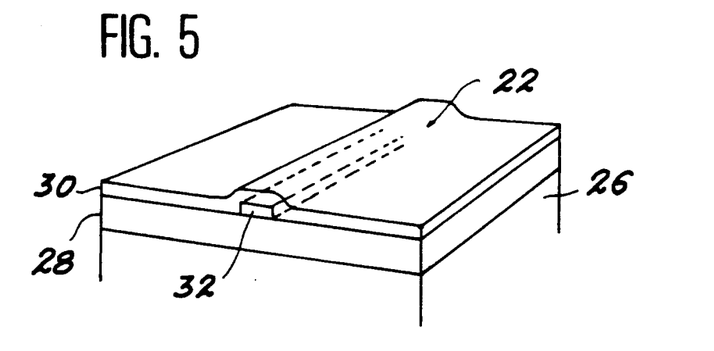
FIG. 5 diagrammatically shows an optical microguide which it is wished to connect to an optical fiber according to the invention.

In a purely indicative and in no way limitative manner, the substrate 26 is of silicon, the layers 28 and 30 are of not intentionally doped silica and the core 32 is of doped silica or silicon nitride or even silicon oxynitride ($SiO_xN_y$).

The production of optical microguide is known.

Figure 6:
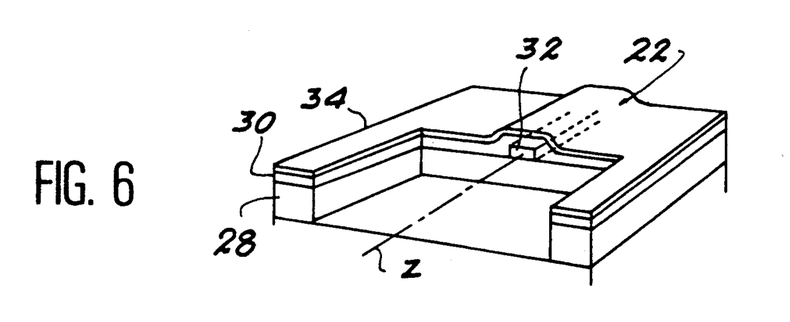
FIGS. 6 and 7 diagrammatically indicate different stages of a connection process according to the invention.

In order to produce the connection between the optical fiber, and the optical microguide, the first step is to eliminate part of the guidance structure, as can be seen in FIG. 6, the thus eliminated zone allowing the axis Z of the microguide core as the median axis.

As shown in FIG. 6, said zone extends from one edge of the microguide 22 and, in plan view, has a substantially rectangular shape. In order to eliminate this zone, the guidance structure is etched through an appropriate mask 34, which is formed beforehand on the layer 30. It consists of a selective etching by which the layers 28 and 30 and the core 32 are eliminated in said zone, but the part of the substrate 26 located below said zone remains substantially intact.

In a purely indicative and non-limitative manner with a silicon substrate, silica layers 28 and 30 and a silica, silicon nitride or silicon oxynitride core 32, it is possible to use a three-layer resin mask, or an amorphous silicon mask or a nickel-chromium mask and it is possible to use a plasma-type, substantially anisotropic dry etching with a fluorine-based reactive gas, such as $C_2F_6$, $CHF_3$ or $CF_4$. After etching the guidance structure, the mask is either eliminated, or maintained on said structure, particularly in the case of a resin mask.

After etching the guidance structure, in the substrate 26 and below the zone of said structure which has been eliminated, is formed a recess 36 (cf. FIG. 7), whose cross-section, through a plane perpendicular to the microguide core axis, is substantially shaped like a U with concave lateral branches in the example shown and which allows, as the plane of symmetry, the plane containing the axis of the microguide core and which is perpendicular to the layers 28 and 30.

Figure 7:
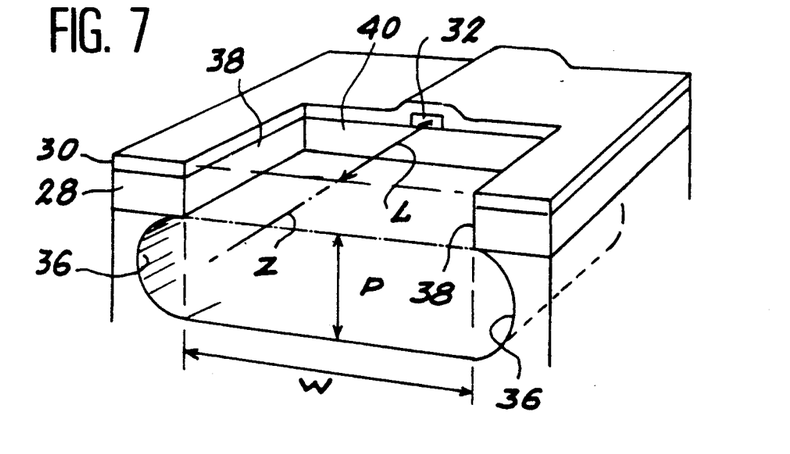

In a purely indicative and non-limitative manner with the aforemention silicon substrate, silica layers 28 and 30 and a silica, silicon nitride or silicon oxynitride core, the previously etched guidance structure is used as the mask and dry isotropic etching of the substrate is performed, such as a reactive ionic etching using microwaves and a fluorine-based reactive gas, e.g. the mixture $SF_6+O_2$, the electromagnetic power levels used being between 200 and 1000 W.

It is appropriate to produce the recess 36 in the substrate with a maximum accuracy depth, which is preferably defined to within one micrometer. Two procedures can be used for this.

A first procedure consists of checking the etching time after accurately calibrating the etching speed. In this way etching precisions of approximately 0.5 to 1 micrometer are obtained to a depth of 60 micrometers.

Another procedure consists of carrying out an in situ interferometric control or check by using an optical interferometer mounted on the machine used for etching the substrate.

The elimination of the zone of the guidance structure leads to the appearance on the latter of side walls 38 and an interface wall 40 on which is located the end of the microguide core 32. Returning to the zone of the guidance structure which has been eliminated, it is appropriate for its length L to be adequate to enable the fiber to be appropriately maintained in the recess 36. This length L can be approximately 100 to 1000 micrometers.

The width W of said zone is determined so as to permit a lateral positioning of the fiber and must therefore be at least equal to the external diameter of said fiber (diameter of the optical cladding of the fiber deprived of its protective sheath). A width W (distance between the side walls 38) equal to said external diameter makes it possible, as shown, to obtain a non-dynamic positioning of the optical fiber. The width W is essentially determined by the dimensions of the mask 34 used for etching the guidance structure.

These dimensions must be calculated taking account of the various overetchings which may subsequently occur, namely during the etching of the substrate 26, and which increase the initial width W by a value generally between 2 and 4 micrometers, as a function of the processes used.

The dimensions of the mask 34 can be without difficulty determined to within 0.5 micrometer, this precision being adequate for performing the connection process according to the invention.

It should be noted that the use of layers 28 and 30, e.g. of silica, which contain the microguide core for the lateral positioning of the fiber facilitate the alignment between the said fiber and the actual microguide.

Figure 7A:
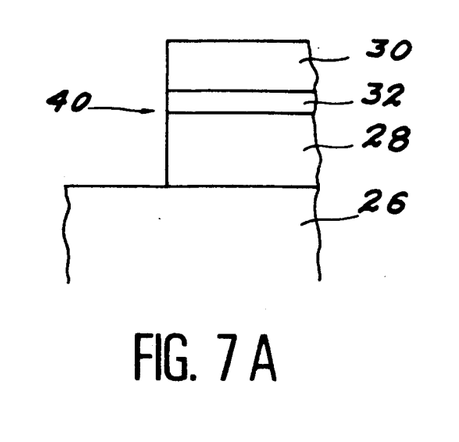
FIGS. 7A and 7B diagrammatically show a differential etching problem with respect to the microguide and which is liable to occur during overetching during the performance of this process, the microguide being shown in section in a plane containing the axis of its core.
Figure 7B:
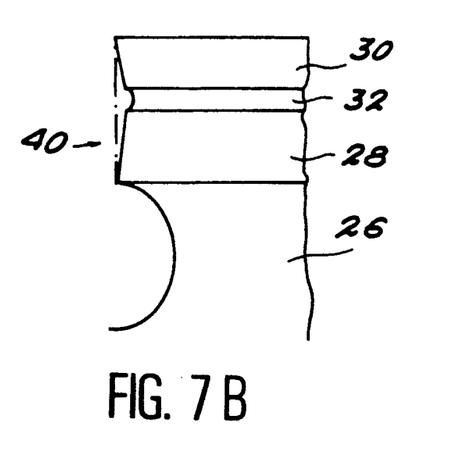
Figure 7C:
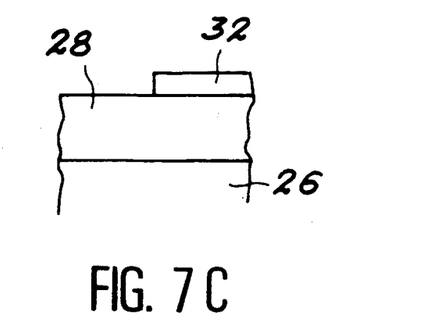
FIGS. 7C to 7E diagrammatically set forth manner of solving this problem, the microguide again being shown in section in a plane containing its core axis.
Figure 7D:
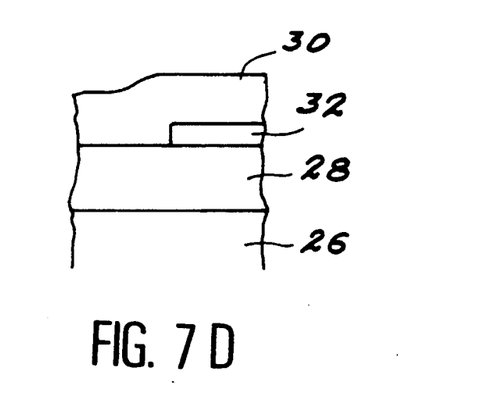

Details will now be given of how account is taken of the overetchings at the interface 40. Thus, in the case of a guide with a non-homogeneous structure (where the layers 28, 30 and 32 are different), e.g. of type $SiO_2$/$Si_3N_4$/$SiO_2$ or $SiO_2$/$SiO_xN_y$/$SiO_2$ on a silicon substrate (FIG. 7A), the core 32 can be etched differently from the surrounding silica medium during the etching of the silicon substrate 26 (FIG. 7B), which can optionally be prejudicial. In order to obviate this, during the production of the microguide, the layer for forming the microguide core is etched in the vicinity of the interface 40 (FIG. 7C). The core 32 is then completely covered by the $SiO_2$ superstrate 30 (FIG. 7D).

Figure 7E:
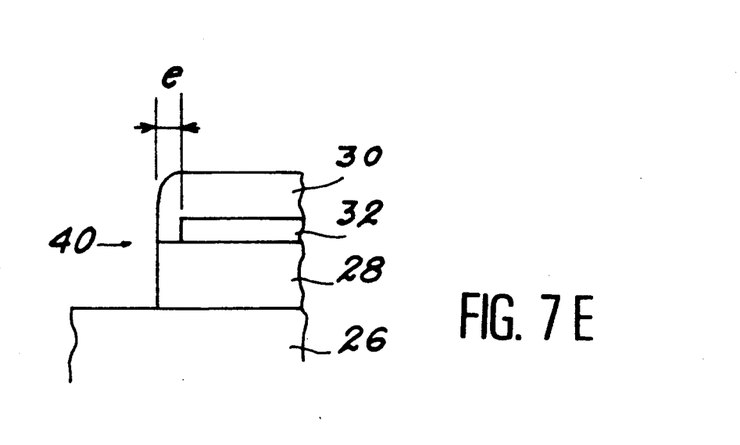

Thus, during the etching of the layers formed on the substrate, which leads to the formation of the interface 40 (FIG. 7E), there is a silica thickness e in front of the core 32 and which obviates the problem of a different etching of the core during the etching of the substrate 26. The thickness e must not exceed 10 to 15 micrometers. This is hardly prejudicial to the efficiency of the coupling and makes it possible to obtain a homogeneous interface.

The depth P of the recess 36 is chosen in such a way that on placing one end of the optical fiber in said recess, the core axis of said fiber substantially coincides with the axis Z of the microguide core 32.

When the etching of the substrate leading to the formation of the recess 36 is finished, one end of the fiber 42 (FIG. 8) is placed in said recess, so that it rests on the bottom of the latter.

Figure 8:
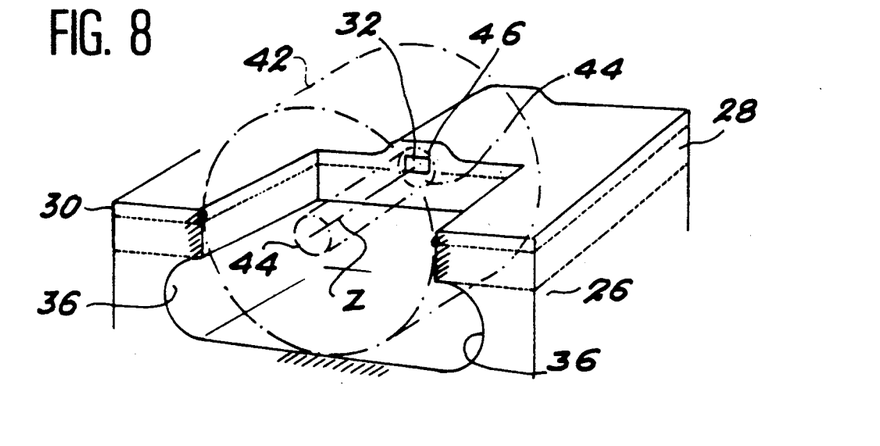
FIG. 8 diagrammatically indicates other stages of the process illustrated by FIGS. 6 and 7.

When the width W is equal to the external diameter of the fiber the lateral positioning of the latter is directly obtained and the vertical positioning of the fiber is also obtained, because the recess depth P has been determined for this purpose, so that the axis of the core 44 of the end of the fiber 42 and the axis Z of the microguide core substantially coincide.

The fixing of the end of the fiber in the recess 36 can be carried out with the aid of an optical adhesive or glue, such as a UV glue sensitive to ultraviolet radiation, e.g. of the type marketed by Nordland under reference NOA 61, whereof a film is placed on the fiber after positioning the end of the said fiber 42 in the recess 36.

As a variant, the fiber is fixed by metallic welding, after depositing metallic layers (eutectic or indium) in the bottom of the recess 36 and at the end of the optical fiber cladding which must be in contact with the bottom of the recess, but obviously not with the end face of the fiber, which must be positioned facing the microguide core.

In the case where a metal weld is used, it is necessary to take account of the thicknesses of the metal layers for the dimensioning of the recess 36.

In order to improve the efficiency of the coupling between the fiber and the microguide, it is possible to place an index adapting material 46 at the fiber guide interface, e.g. in the form of an appropriate adhesive or gel, said material being e.g. injected following the mechanical positioning of the fiber.

The distance D (FIG. 9) between the optical fiber and the optical microguide is not a critical parameter in the end-to-end connection and a distance D of approximately 10 to 20 micrometers is acceptable and is even more so when using the index adapting material at the fiber guide interface (in order to eliminate the optical losses known as Fresnel losses).

Figure 9:
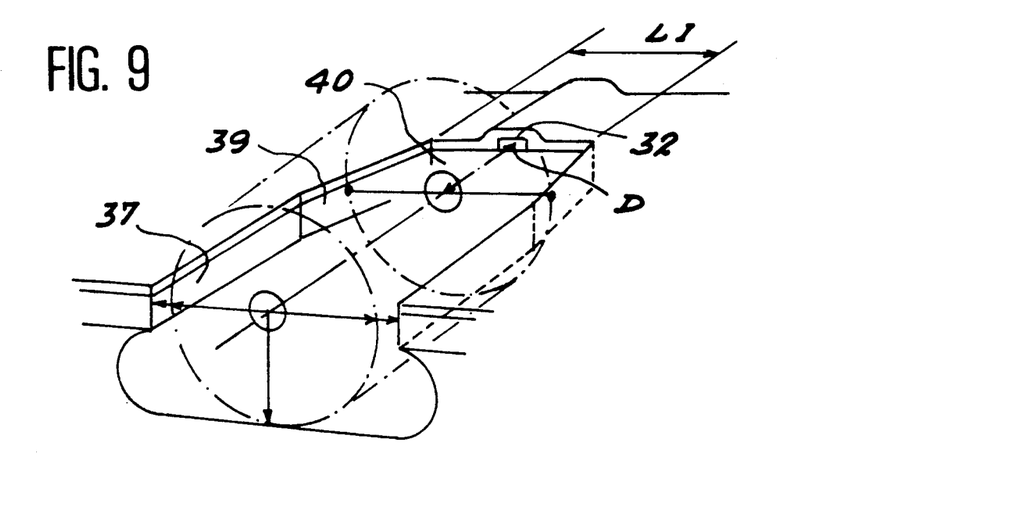
FIG. 9 diagrammatically illustrates a variant of this process.

This non-criticality property is usable for further improving the relative positioning of the optical fiber and optical microguide by producing a mask 34 making it possible to eliminate from the guidance structure a zone leading to side walls 38 which, from the side of the interface wall 40, approach one another on moving towards said wall 40 and as shown in FIG. 9.

More specifically, each side wall 38 then comprises a first part 37 located on the side of the edge of the structure and parallel to the axis Z and a second part 39 forming an acute angle with said axis Z and which approaches the latter on moving towards the interface wall 40.

In this case, an identical convergence is obtained for the recess 36 when the substrate 26 has been etched for forming said recess. It is then possible to position the end of the optical fiber 42 so as to abut against the parts 39 of the side walls of the structure.

Without leading to any deterioration in the coupling quality between the fiber and the microguide, it is possible to make up a reading error of +1 micrometer over the width W of the eliminated zone without encountering any difficulty.

With an angle of e.g. approximately 6° between each part 39 of the side wall and the axis Z of the microguide core, this leads to an ideal fiber positioning relative to the microguide, with a distance D less than 10 micrometers, for an interface width LI of the microguide equal to 125 micrometers and for an optical fiber with an external cladding diameter between 125 and 127 micrometers giving an optical loss of only approximately 0.2 dB.

On considering a microguide having a silicon substrate 28 and whose layers 28 and 30 are of silica, a reactive ionic etching of said substrate is highly isotropic. The overetching S (under the silica layers, cf. FIG. 10) is approximately 30 micrometers for a recess depth P of approximately 60 micrometers (S being generally approximately P/2).

Figure 10:
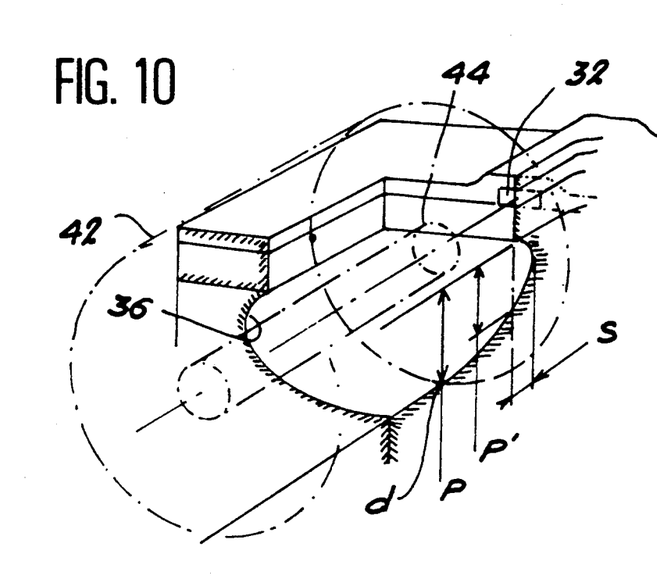
FIG. 10 a correct alignment of the core of an optical fiber the core of an optical microguide obtained according to the invention.

However, perpendicular to the material used for the mask for said silicon substrate etching, the shape of the recess leads to a depth P', which is slightly less than P, as can be seen in FIG. 10. This is not prejudicial to the positioning of an optical fiber having a circular cross-section and whose end is not positioned too close to the microguide core end, the bringing into coincidence of the axis of the core of said fiber end and the axis of the microguide core being substantially obtained in the desired manner.

However, said different depth P' becomes prejudicial when the optical fiber end is moved closer to the microguide core end. Thus, as from a point d (cf. FIG. 11), the optical fiber end rises slightly following the shape of the recess and there is a both angular and vertical misalignment between the axis of the core of the optical fiber end and the axis of the microguide core, which leads to a reduction in the coupling between the optical fiber and the optical microguide.

Figure 11:
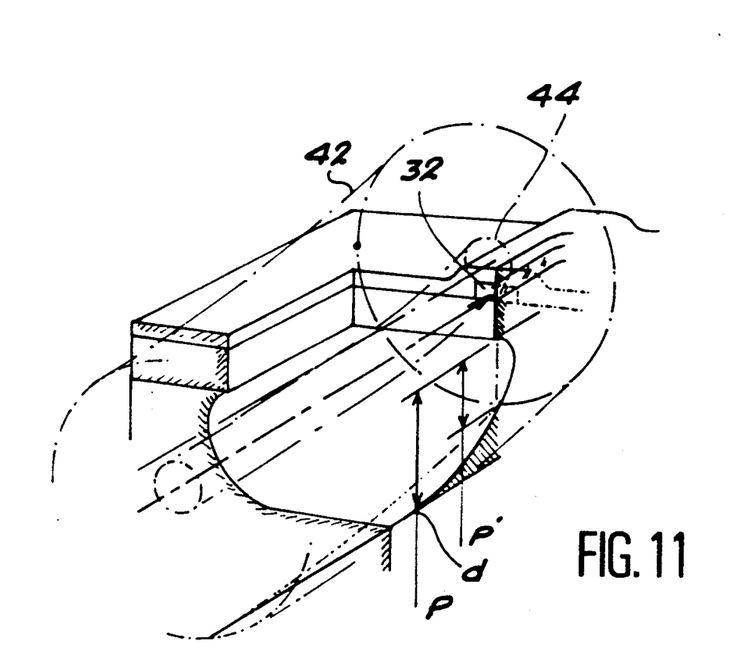
FIG. 11 diagrammatically the misalignment liable to occur between the fiber and the microguide when the fiber is too close to the microguide core.

In order to obviate this disadvantage, it is necessary to make P' as close as possible to P and therefore reduce, during the substrate etching, the shadowing effect of the mask used for said etching. To do this, a modification is made to the shape of that part of the structure which corresponds to the fiber microguide interface. More specifically, it is ensured that said part overhangs the bottom of the recess.

Figure 12:
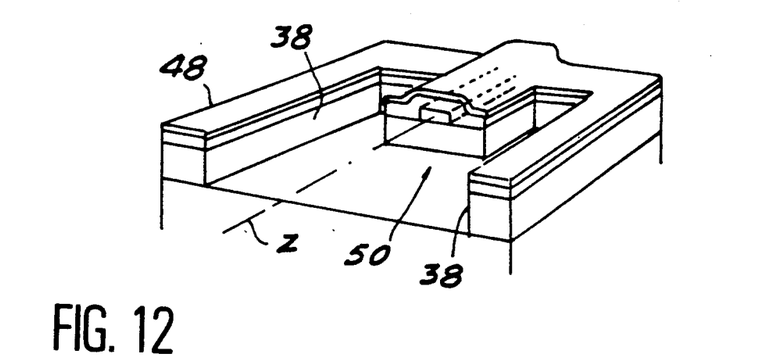
FIGS. 12 to 14 diagrammatically a process according to the invention making it possible to obviate this disadvantage.

For this purpose, etching takes place of the guidance structure (FIG. 12) using a mask 48, whose shape is chosen so as to free a part of the guidance structure in the form of a tongue 50, whose median axis is the microguide core axis Z. This tongue 50 advances between the side walls 38 of the structure when the latter has been etched through the mask 48.

This is followed by a selective etching of the substrate 26 (FIG. 13) beneath the tongue 50 and beneath the previously etched guidance structure zone, so as to free said tongue 50. Thus, the tongue overhangs over the bottom of the recess resulting from the etching of the substrate.

Figure 13:
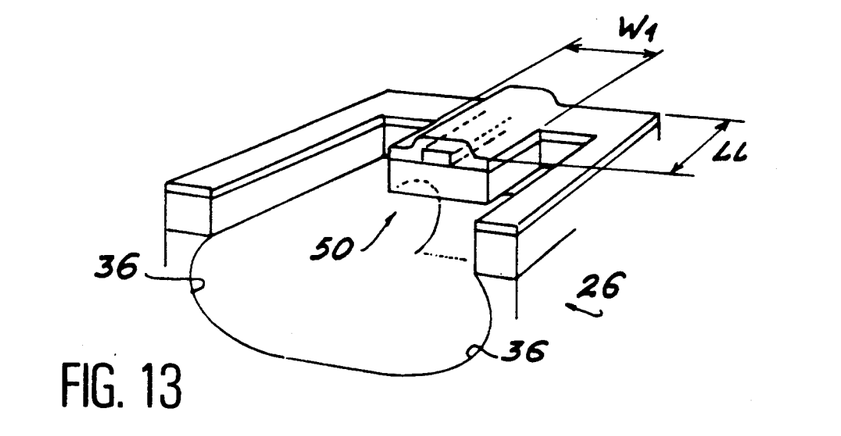

By forming a tongue with a length LL at least equal to the depth P of the recess formed in the substrate and whose width w1 is at the most equal to said depth P, the etching of the substrate (etching the silicon in the case of a silicon substrate), which has taken place in three directions respectively perpendicular to the three free faces of the tongue, makes it possible to obtain a perpendicular distance P' very close to P and therefore greatly reduce the parasitic fiber rise phenomenon.

In practice, e.g. for monomode microguide structures, it is possible to choose for LL a value of approximately 60 to 100 micrometers and for w1 a value of approximately 20 to 30 micrometers.

Figure 14:
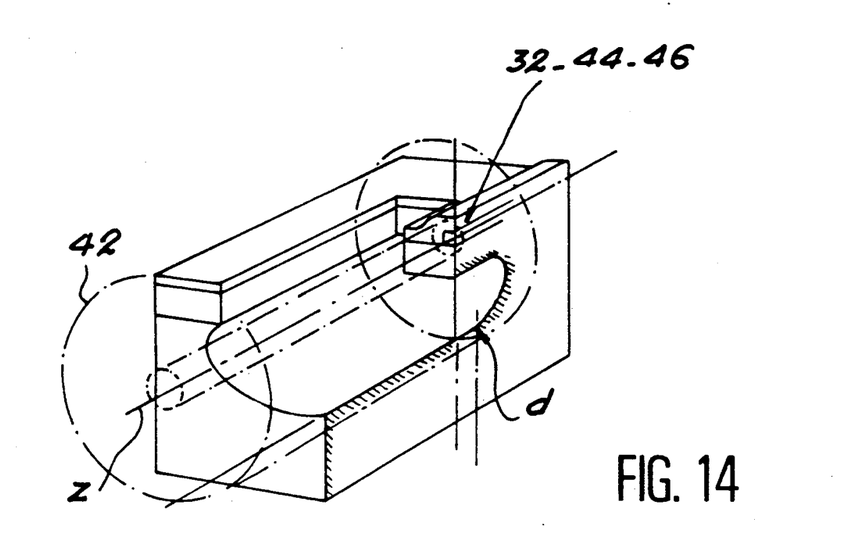

Once the tongue has been formed, as previously, fixing takes place of the end of the optical fiber 42 (FIG. 14) in the recess formed in the substrate, so that the end face of the fiber faces the end face of the tongue 50 and the axis of the core of said fiber end substantially coincides with the microguide core axis Z located in the tongue.

The present invention can be realized with a guidance structure formed on a silicon substrate and having a silica layer 28, whose thickness is between 2 and 15 micrometers, a silica layer 30 having a thickness between 5 and 10 micrometers and a silicon nitride core 32 with a thickness between 0.1 and 0.2 micrometer.

The invention can also be realized with a guidance structure formed on a silicon substrate and having a silica layer 28 with a thickness between 6 and 12 micrometers, a silica layer 30 with a thickness between 2 and 10 micrometers and a doped silica core 32 with a thickness between 2 and 6 micrometers.

An explanation will now be given of a special embodiment of the invention with reference to FIGS. 15 to 20. It is firstly pointed out that the structure of FIG. 5 is conventionally produced in the following way. The layer 28 is formed on the Si substrate. On the layer 28 is formed an intermediate layer from which the core 32 will be formed. A first mask is formed on said intermediate layer. This mask is etched in order to make it possible to form the core 32. The intermediate layer is etched through said mask, which leads to the core 32. The first mask is removed. The layer 30 is deposited and gives the structure of FIG. 5. A process according to the invention can then be performed (FIGS. 6 to 8). However, a problem arises. The opening of the silica guidance structure takes place with the aid of a second mask level 34 different from the first mask used for producing the microguide core 32. In order to have a good fiber microguide connection, it is necessary for the microguide core axis to coincide with the axis of the silica opening. However, this is not the case in practice. This is due to alignment problems of the two masked levels, particularly due to the topography (depressions and protuberances of several micrometers).

To solve the problem and have a better alignment, the following procedure described relative to FIGS. 15 to 20 is adopted.

Figure 15:
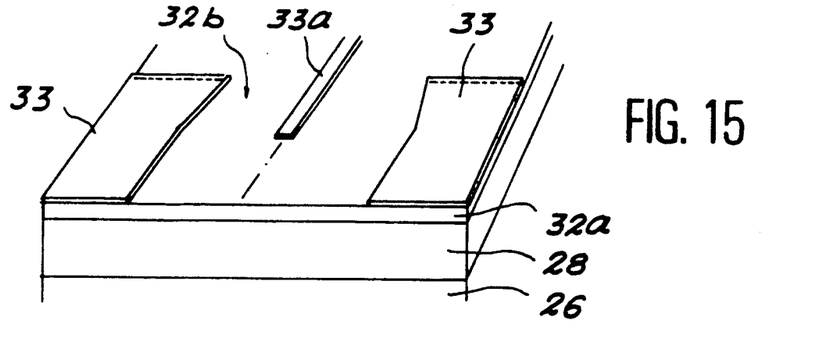
FIGS. 15 to 20 diagrammatically different stages of another process according to the invention.

The layer 28 (buffer layer) is formed on the Si substrate (FIG. 15). On layer 28 is formed an intermediate layer 32a intended to form the microguide core 32. A masking material 33 is deposited on the layer 32a. This material 33 (e.g. amorphous Si, metal or three-layer resin) permits a dry etching of the silica layer 32a.

The material 32 is then etched so as to remain above the zone corresponding to the microguide core and allow the appearance of a zone 32b of said layer 32a, said zone 32b having a width W and allowing the axis Z of the subsequently formed core 32 as the median axis.

Figure 16:
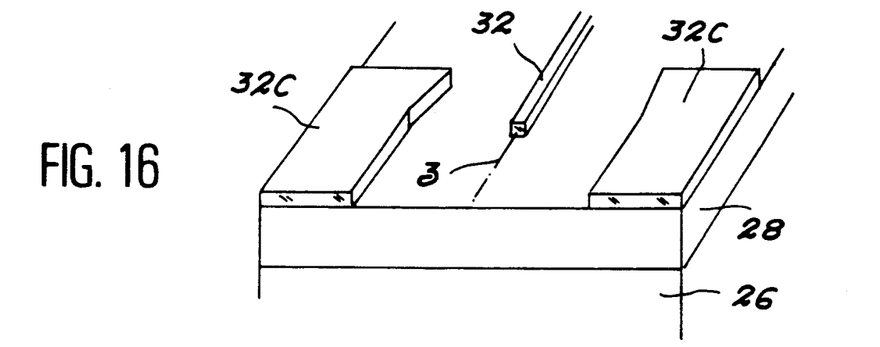

This is followed by the advantageously substantially anisotropic etching of the layer 32a through the mask formed. After removing the latter, this gives the microguide core 32 and on either side of the latter two silica parts 32c, which remain and are symmetrical to one another with respect to the axis z (FIG. 16). Thus, the first silica opening level has been defined, which will "predefine" the positioning of the optical fiber. This is followed by the formation on the resulting structure of a silica overlap or covering layer 30a (FIG. 17), which is homologous to the layer 30 of FIG. 5.

Figures 17, 18:
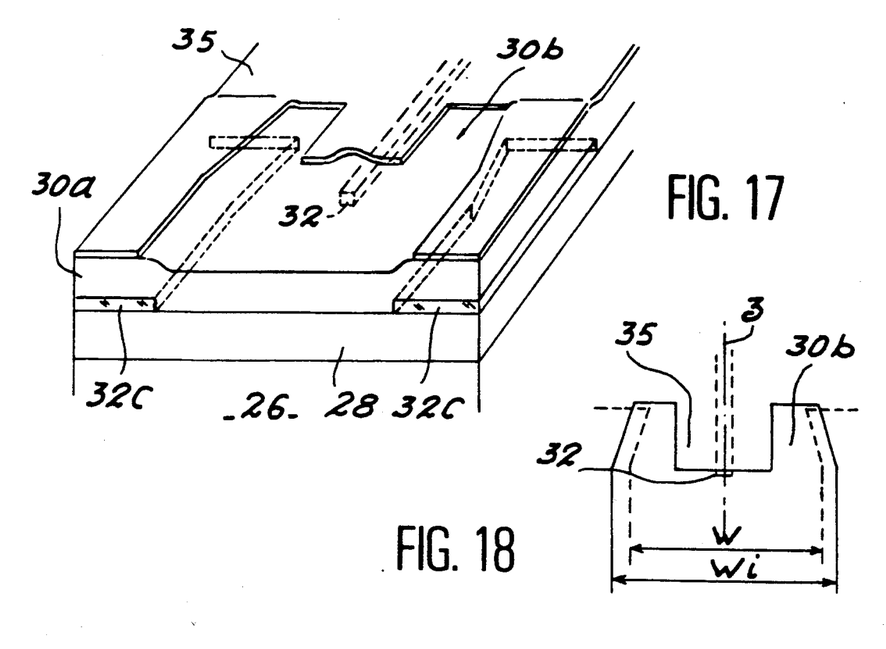

This is followed by the deposition on the layer 30a of the second masking material 35, which relates to the subsequent dry etching of the silica layers 28 and 30a (FIGS. 17 and 18). This material 35 is then etched in the manner shown in FIGS. 17 and 18, while taking account of the superimposing uncertainty of the mask. The zone 30b which appears as a result of the etching of the material 35, in plan view, substantially allows the axis z as the median axis, but the width Wi of said zone 30b exceeds W, the difference (Wi−W)/2 being at least equal to said uncertainty, which is of a technical order of magnitude. For example, if the superimposing can be obtained to within one micrometer, Wi−W is then chosen at least equal to 2 micrometers e.g. 2.5 micrometers.

It is pointed out that the width W in the example described relative to FIGS. 15 to 20, is equal to a width determined both by the fibre diameter and by the thickness of the layers 28 and 30.

It can be seen from FIGS. 17 and 18 that the etching of the material 35 is also provided, in the represented case, in such a way as to obtain, after etching the guidance structure and then the substrate, a tongue like tongue 50 of FIG. 13.

Figure 19:
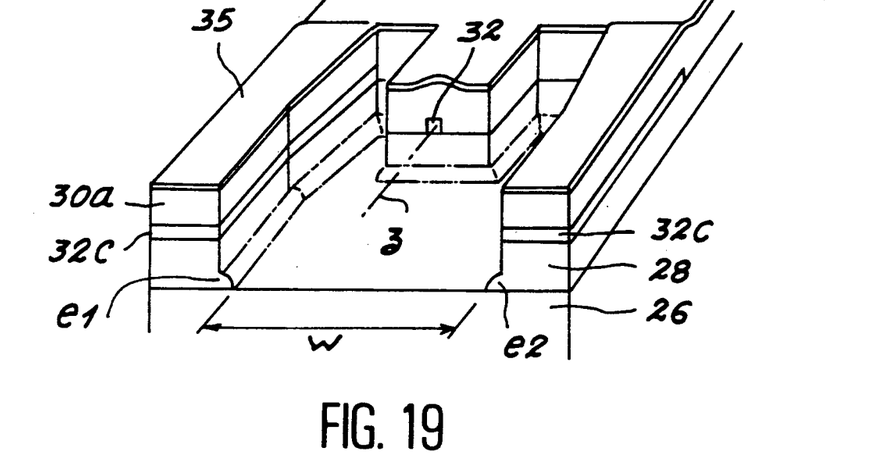
Figure 20:
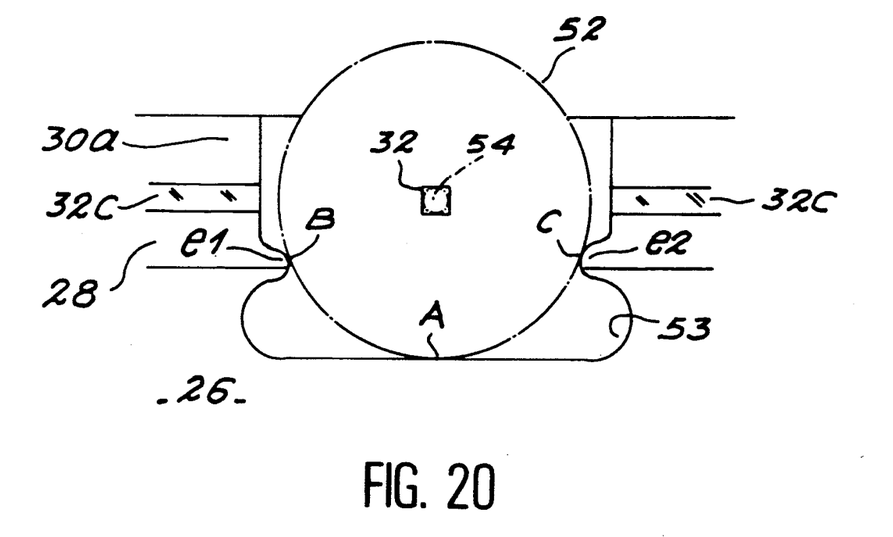

This is followed by the substantially anisotropic etching of the layers 28 and 30, up to the substrate 26, through the second mask obtained by etching said material 35. This second mask is then removed. It should be noted that shoulders e1 and e2 are created on the sides of the layer 28 and at the bottom thereof, as a result of the etching of the layers 28 and 30a (FIG. 19). The median axis of these shoulders always coincides, in plan view, with the microguide axis z (where this is not necessarily the case for the median axis of the second mask).

This is followed by dry isotropic etching of the substrate 26, followed by the positioning of the optical fiber 52 (FIG. 20) in the thus obtained recess 53. The fiber 52 bears on the bottom of the groove-like recess (points A), seen in section in FIG. 20 and also on the ends B and C of the shoulders. The axis of the fiber core 54 (chosen in such a way that said axis is also the axis of symmetry of the fiber to within 0.2 micrometer) will therefore coincide with the microguide axis z (obviously in the case where the vertical positioning is precise), thus ensuring an excellent alignment.

Obviously, numerous modifications and variations of the present invention are possible in light of the above teachings. It is therefore to be understood that within the scope of the appended claims, the invention may be

We claim:

1. A connection process between an optical fiber and an optical microguide which includes, on a substrate, a guidance structure having a core and two media, the respective refractive indices of which are below those of the core of the structure, said core being located between the two media, said process comprising the steps of:
- a first etching of the guidance structure from one end of the optical microguide, so as to eliminate from said structure a zone allowing the axis of the microguide core as a median line and whose width is at least equal to the external diameter of the optical fiber, the lateral walls of the etched structure respectively forming in a direction parallel to the axis of the microguide, a bearing line for the fiber,
- a second etching of a part of the substrate located beneath said zone which has been eliminated, said second etching being carried out by a dry process, through the etched guidance structure, said guidance structure acting as a mask, and over a depth making it possible to bring about coincidence between the axis of the core of the microguide and the axis of the core of one end of the fiber, when said end rests on the bottom of a recess thus formed in the substrate and
- fixing the end of the optical fiber in the recess so as to obtain said coincidence.

2. Process according to claim 1, wherein the first etching comprises anisotropic etching.

3. Process according to claim 1, wherein the second etching comprises isotropic etching.

4. Process according to claim 1, wherein the width of the zone is equal to the external diameter of the fiber.

5. Process according to claim 3, wherein the substrate comprises silicon and the second etching comprises reactive ionic etching.

6. Process according to claim 1, wherein the substrate comprises silicon, and the media which are adjacent to the core comprise not intentionally doped silica layers and wherein the core comprises doped silica.

7. Process according to claim 1, wherein the substrate comprises silicon, the media adjacent to the core comprise not intentionally doped silica layers and the core comprises one of silicon nitride and silicon oxynitride.

8. Process according to claim 6, wherein the total thickness of the silicon layers is approximately 15 to 30 micrometers.

9. Process according to claim 7, wherein the total thickness of the silica layers is approximately 15 to 30 micrometers.

10. Process according to claim 1, which comprises etching the guidance structure and substrate in such a way that, from the side of the fiber-microguide interface, the width of the eliminated zone decreases towards said interface.

11. Process according to claim 1, which comprises etching the guidance structure during the first etching, so as to free therefrom a tongue, which allows as the median line the axis of the microguide core and whose width is at the most equal to the depth of the recess.

12. Process according to claim 11, wherein the length of the tongue is at least equal to the depth of the recess.

13. Process according to claim 1, wherein the microguide comprises a superstrate which completely covers the microguide core and which comprises etching the guidance structure during the first etching so as to leave a small superstrate thickness in front of the core.

14. Process according to claim 1, which comprises placing an index adapting material at the fiber-microguide interface.

15. Connection process between an optical fiber and an optical microguide which includes, on a substrate, a guidance structure having a core and two media, the respective reflective indices of which are below that of the microguide core of the structure, said core being located between the two media, said process comprising:
- forming one of the media on the substrate,
- forming on said one of the media formed on the substrate an intermediate layer from which the microguide core is substantially produced,
- etching by a first etching the intermediate layer so as to form the core of the microguide and so as to eliminate from said intermediate layer a zone allowing the axis of the microguide core as the median line and having a width so as to permit the subsequent positioning of the optical fiber in alignment with the microguide core,
- forming on the structure resulting from said etching of the intermediate layer an overlap layer which comprises the other of the media,
- etching the resulting guidance structure by a second etching so as to eliminate from said guidance structure another zone substantially allowing the axis of the microguide core as a median line and having a width, decreased by the width of the zone which is eliminated from the intermediate layer, which is at least equal to twice the uncertainty upon the superimposing of said zone,
- forming two shoulders at least in the first media, wherein said two shoulders comprise bearing surfaces for the optical fiber,
- a third dry etching, through the resulting guidance structure acting as a mask, of the substrate located beneath said mask, over a depth so as to bring about coincidence between the axis of the microguide core and the axis of the core of one end of the fiber when said end rests on the bottom of the recess formed in the substrate; and
- fixing the end of the optical fiber in said recess so as to bring about the coincidence.

16. Process according to claim 15, wherein the first and second etchings comprise anisotropic etchings.

17. Process according to claim 15, wherein the third dry etching comprises isotropic etching.

18. Process according to claim 15, wherein by the second etching forms a tongue which has a median axis the axis of the microguide core and whose width is at most equal to the depth of the recess.

19. Process according to claim 15, wherein by the second etching a tongue is formed which has as a median axis the axis of the microguide core and whose length is at least equal to the depth of the recess.

* * * * *